(12) United States Patent
Hahn (10) Patent No.: US 7,592,729 B2
(45) Date of Patent: Sep. 22, 2009

(54) POLYPHASE MOTOR WITH OPTIMISED RUNNING CHARACTERISTICS

(75) Inventor: Ingo Hahn, Lohr am Main (DE)

(73) Assignee: Rexroth Indramat GmbH, Lohr am Main (DE)

( * ) Notice: Subject to any disclaimer, the term of this patent is extended or adjusted under 35 U.S.C. 154(b) by 474 days.

(21) Appl. No.: 10/543,802

(22) PCT Filed: Oct. 17, 2003

(86) PCT No.: PCT/DE03/03440

§ 371 (c)(1),
(2), (4) Date: Apr. 7, 2006

(87) PCT Pub. No.: WO2004/070921

PCT Pub. Date: Aug. 19, 2004

(65) Prior Publication Data

US 2006/0202579 A1 Sep. 14, 2006

(30) Foreign Application Priority Data

Jan. 30, 2003 (DE) ................................. 103 03 848

(51) Int. Cl.
*H02K 21/12* (2006.01)
(52) U.S. Cl. ................................. 310/156.48; 310/269
(58) Field of Classification Search ................................
310/156.43–156.48, 216–217, 254, 261, 310/269
See application file for complete search history.

(56) References Cited

U.S. PATENT DOCUMENTS

| | | | |
|---|---|---|---|
| 4,751,416 A | 6/1988 | Torok | |
| 4,769,567 A | 9/1988 | Kurauchi et al. | |
| 5,610,464 A | 3/1997 | Asano et al. | |
| 6,222,288 B1 | 4/2001 | Benito Izquierdo | |
| 7,067,948 B2 * | 6/2006 | Yamaguchi et al. | .... 310/156.47 |
| 7,196,445 B2 * | 3/2007 | Yamaguchi et al. | .... 310/156.47 |
| 2002/0074887 A1 | 6/2002 | Takano et al. | |

FOREIGN PATENT DOCUMENTS

| | | |
|---|---|---|
| DE | 4133723 | 4/1993 |
| EP | 1130747 | 5/2001 |

(Continued)

OTHER PUBLICATIONS

"Magnet Shaping to Reduce Induced . . . ", Jaime De La Ree, et al, IEEE Transaction on Energy Conversion, vol. 6, No. 1, Mar. 1991, pp. 155-161.

(Continued)

*Primary Examiner*—Thanh Lam
(74) *Attorney, Agent, or Firm*—Michael J. Striker (57) ABSTRACT

A three-phase machine has a primary part having N grooves and m electrical phase windings; a secondary part having a number p of pole pairs (P1-P4), each comprised of two magnetic poles of different polarities; wherein the pole gap is essentially the same for all of the pole pairs (P1-P4) and results from an even distribution of all of the poles on the secondary part; and at least one pole pair (P1-P4), with no change to its pole gap, is shifted by a predetermined distance in relation to an equidistant distribution of all of the pole pairs.

8 Claims, 6 Drawing Sheets

FOREIGN PATENT DOCUMENTS

WO    02082622    10/2002

OTHER PUBLICATIONS

"Induced Voltage Harmonic Reduction . . . ", Jaime De La Ree, et al, IEEE Transactions on Industry Applications, vol. 28, No. 3, May/Jun. 1992. pp. 619-624.

"Reducing Torque Ripple in PM Synchronous . . . ", Nicola Bianchi, et al, ICEM 2000 Aug. 28-30, 2000 Espoo Finland, pp. 1222-1226.

"Design of Permanent Magnet Motors . . . ", W. Cai. D. Fultor, et al, ICEM 2000 Aug. 28-30, 2000 Espoo Finland, pp. 1384-1388.

\* cited by examiner

FIG. 1

FIG. 2 (UNIT CIRCLE)

FIG. 3 (VECTOR ADDITION, Vmax=V1+V2+V3+V4)

FIG. 4 (SCHEMATIC REPRESENTATION OF POLE PAIR GROUPINGS FROM CLAIM 6)

FIG. 5.

(SCHEMATIC REPRESENTATION OF CORRESPONDING MAGNETIZATION APPARATUS)

FIG. 6 (THREE BRANCHES OF A PHASE WINDING FOR EMBODYING A PHASE WITH 18 TEETH)

ained by the machine. The ripple has more or less influence on the precision of the executed movement as well as the service life of the machine and can be determined proportionally by means of the formula for calculating the K factor by setting the harmonic content in relation to the fundamental.

POLYPHASE MOTOR WITH OPTIMISED RUNNING CHARACTERISTICS

CROSS-REFERENCE TO A RELATED APPLICATION

The invention described and claimed hereinbelow is also described in German Patent Application DE 103 03 848.5 filed on Jan. 30, 2003. This German Patent Application, whose subject matter is incorporated here by reference, provides the basis for a claim of priority of invention under 35 U.S.C. 119(a)-(d).

BACKGROUND OF THE INVENTION

The present invention relates to a three-phase machine, which is used in electromechanical devices, among other things, as a drive unit or for positioning and machining work pieces. The running properties of such machines—such as quietness of operation and constant torque—are negatively influenced during operation by structurally dictated disturbance variables.

One of these disturbance variables is referred to as detent torque. The detent torque is based on a reluctance effect (reluctance=permeance) and is composed of a fundamental wave and harmonic waves. The periodicity of the fundamental depends on the geometry of the machine. The frequencies of the harmonics are integral multiples of the fundamental. In actual practice, the detent torque inhibits movement, particularly at the start of movement, when the secondary part (moving component) changes its position in relation to the primary part (stationary component). The most pronounced harmonic, also referred to as the dominant harmonic, is associated with a particular wavelength that determines the periodicity of the harmonic.

Another disturbance variable is the voltage that is induced in the stator windings. The induced voltage is triggered by the change in the flux linking and as a rule, due to the non-sinusoidal excitation field, indicates a more or less harmonic-laden signal shape. The measured harmonicity of the induced voltage is a measure for the torque ripple that is subsequently present during operation of the machine, even under load. The ripple has more or less influence on the precision of the executed movement as well as the service life of the machine and can be determined proportionally by means of the formula for calculating the K factor by setting the harmonic content in relation to the fundamental.

A wide variety of methods have already been developed for reducing the detent torque. For example in multi-pole, rotationally symmetrical, permanent magnet-excited machines, it is possible to reduce this disturbance variable by means of inclined magnetization or staggered rotor magnets and by means of inclined stator grooves. These methods, however, increase manufacturing complexity because they require additional work steps, which increases production costs.

Another scheme for reducing detent torque lies in varying the distance between the magnetic poles that generate the excitation field. This idea is described extensively in the publications *Reducing Torque Ripple in PM Synchronous Motors by Pole Shifting*, by N. Bianchi and S. Bolognani, in Proc. ICEM 2000, pp. 1221-1226, Helsinki: Helsinki University of Technology, 2000 and *Design of Permanent Magnet Motors With Low Torque Ripples: A Review*, by W. Cai, D. Fulton, K. Reichert, in Proc. ICEM 2000, pp. 1384-1385, Helsinki: Helsinki University of Technology, 2000. Assembled poles that are skillfully arranged in relation to one another can also reduce the detent torque. The patent application DE 41 33 723 A1 makes use of this method. The rotating field motor disclosed therein has an octagonal rotor with poles distributed over its circumference. Four poles comprise a unit. The distances of the poles from one another are uneven. There are a total of two units, each with 4 poles, whose detent torques overlap one another in a phase-shifted manner and thus reduce the resulting detent torque of the machine. In the approach demonstrated, only the fundamental of the detent torque is taken into consideration and it is not completely compensated for. Harmonics of the detent torque are not taken into consideration. It should also be noted that embodying the rotor in the way shown in the example results in an uneven air gap and the structure is not circumferentially symmetrical. An imbalance arises, which upon rotation, exerts a periodically overlapping interference force on the axle bearing. With low weights or small bores, this imbalance must be compensated for in order to prevent bearing damage.

The arrangement demonstrated in the application DE 41 33 723 A1 was also not tested with regard to the induced voltage generated in the winding of the primary part. Particularly when embodying a generator, however, it is desirable to have an output voltage that is sinusoidal as possible. The higher the harmonic content of the output voltage, the higher the divergence from the pure sinusoidal form. A motor, though, would require a torque that is as free of harmonics as possible. Approaches aimed at reducing harmonicity are discussed in the publication *Magnet Shaping to Reduce Induced Voltage Harmonics in PM Machines With Surface Mounted Magnets*, by Jaime De La Ree and Nady Boules in IEEE Transactions on Energy Conversion, vol. 6, no. 1, March 1991 or *Induced Voltage Harmonics Reduction of PM Cylindrical Machines*, in IEEE Transactions of Industrial Applications on Industry Applications, vol. 28, no. 3, May/June 1992. In these cases, the aim is to grapple with the problem in permanent magnet-excited motors by optimizing the dimensions and shape of the excitation magnets. It is known that the shape of the excitation magnets can be used to influence the signal shape of the no-load voltage, for example by using radially magnetized shell magnets. But particularly when constructing larger rotor diameters, it is no longer possible to use glued-on shell magnets to reduce the induced voltage because they contribute to high eddy current losses. Larger rotors can also be embodied using inexpensive segmented flat magnets to limit eddy current losses. But the change in the magnet shape then results in a further increase in the harmonic content of the induced voltage.

The magnet width can also be used to influence and reduce harmonics. This approach is taken by the application EP 1130747 A2 in that the magnitude of an angle defined between the rotor axis and the two sides of a magnet embedded in the stator is varied in order to influence the field distribution. Among other things, this optimizes the induced voltage and the detent torque. In actual practice, though, this leads to complex geometrically required manufacturing procedures. The aim, however, is to use standard magnets that can be purchased in bulk and used for a wide variety of machine geometries, independent of the dimensions of the machine.

SUMMARY OF THE INVENTION

The present invention should teach those skilled in the art a method with which they can reduce the disturbance variables of a three-phase machine during operation. The central object of the present invention is to not limit the scope to a single disturbance source, but to find a compromise that results in an efficient reduction of at least two interrelated disturbance variables. The technical complexity and resulting manufacturing costs should be as low as possible.

Another object of the present invention is to provide an apparatus that can be used to produce the poles for the manufacture of a permanent magnet-excited three-phase machine according to the present invention.

In electric machines used for machining work pieces (including milling, grinding, drilling), the present invention is intended to increase the precision of the parts to be machined and thus to reduce manufacturing tolerances.

These objects are attained according to the present invention by a first embodiment form in that a) the pole gap (6) is essentially the same for all of the pole pairs and results from an even distribution of all of the poles on the secondary part;

b) at least one pole pair, with no change to its pole gap (6), is shifted by a predetermined distance in relation to an equidistant distribution of all of the pole pairs.

The invention according to this embodiment has the advantage that in addition to the geometrically induced suppression of the fundamental of the detent torque by a newly achieved degree of freedom with regard to the placement and spacing of the pole pairs in relation to one another, an additional attenuation of higher harmonics of the detent torque is achieved, which has an on the whole positive effect on the existing detent torque spectrum;

it is possible to completely eliminate individual manufacturing steps such as the inclination of grooves or the staggering of magnets, thus permitting a reduction in costs;

there is now a universal method for reducing detent torque since it can in principle be applied to all machine types;

the higher harmonics of the induced voltage in addition to the detent torque are additionally attenuated and thus the torque ripple is reduced, although the optimization is designed for the most effective possible reduction of the detent torque.

The above-mentioned objects are also attained according to the present invention by a second embodiment form in that a) the pole gap (6) is essentially the same for all of the pole pairs and results from an even distribution of all of the magnetic poles on the secondary part;

b) pole pairs in immediate succession constitute groups b.1.1 the number of pole pairs in each group is identical, b.1.2 a group contains at least two pole pairs, b.1.3 there are at least two groups, b.1.4 each pole pair is associated with one pole pair group, b. 1.5 the groups are distributed equidistantly along the secondary part, b.1.6 in relation to an equidistant distribution of all of the pole pairs on the secondary part, all of the pole pairs of one group are shifted in relation to one another by a preset distance and in a preset direction, which are the same for all groups, so that the pole pair gap (5) within each group is essentially uniform.

In addition to the advantages already cited for the first embodiment, the second embodiment has additional advantages, namely that at least two disturbance influences are specifically reduced and optimized simultaneously in that gaps between poles and pole pairs are calculated that do not in fact result in the complete suppression of the dominant harmonic of the detent torque, but attenuate it as much as possible;

the circumferentially symmetrical arrangement of the poles prevents an imbalance and thus makes it possible to eliminate costly balancing procedures during manufacture;

the improved running properties due to the reduced radial forces prevent a premature wear, e.g. on the rotor shaft bearings, because the symmetrical design renders the system statically and dynamically balanced.

One principle of the present invention lies in arranging the magnetic pole pairs and sizing the pole gaps and pole pair gaps so that there is an advantageous attenuation not only of the detent torque but also of the higher harmonics of the induced voltage. The principle can be used on any type of machine, e.g. on external and internal rotors and on linear motors. The magnetic poles can be attached to the secondary part as well as integrated into it, i.e. inside it, so that in the latter case, there is a uniform mechanical gap between the primary and secondary part. Depending on the geometry of the machine and the stated object, the effect according to the present invention is achieved by reducing or enlarging the gaps between neighboring different pole pairs. In the event of a rotationally symmetrical system, the distance can also be defined by an angular amount instead of by means of the groove pitch. The angle reflects a circular segment of the rotor circumference circle while the distance corresponds to the arc length of this segment. In linear motors, the distance is as a rule defined by a line segment between the poles.

The embodiment according to the present invention is not limited to particular harmonics of the detent torque or of the induced voltage. The harmonics present during operation and their intensity depend instead on the geometry and embodiment of the primary and secondary part, in particular the groove/pole ratio of the machine, the groove and pole distribution, the coil width of the rotating or traveling field winding, the coil factor, the embodiment form of the poles (height, width, and shape of permanent magnets), the number of holes, the number of phase windings, the winding method (concentrated or distributed), and the connection of the windings or coil groups to one another (parallel, serial, or combinations thereof). The required pole gaps and pole pair gaps must therefore be calculated anew for each machine and tuned to the harmonics to be attenuated or to the desired effects. The required pole coverage depends on the torque required by the application and can be extremely varied. The practically achievable pole gaps and pole pair gaps are predetermined by the required pole coverage and can best be used for an optimization in the context of the displacement bandwidth generated.

A rotationally symmetrical three-phase machine according to second embodiment can be embodied so that with a groove/pole ratio of 3/2 (with N=18 and P=12), harmonics of the induced voltage with the order numbers k=5, 7, 11, etc. occur and are attenuated by the embodiment according to the present invention. In this case, 3 grooves are associated with a pole pair and a coil width of $$w = \frac{2\pi}{3}$$

Is selected, which also corresponds to the groove pitch. The 12 poles of the 6 pole pairs have a constant pole gap (e.g. 3/2 times the groove pitch). The structurally induced $18^{th}$ harmonic of the detent torque is completely suppressed due to the identical pole gaps. The reason for this is that the mechanical distance between the poles corresponds to an integral multiple of half the groove pitch (electrical angle of n*PI, with n=1, 2, 3, 4, etc.) and this automatically results from the uniform distribution of all of the poles on the secondary part. As a function of the number grooves N=18, therefore, the $36^{th}$ harmonic becomes the dominant harmonic of the detent torque. The envelope curve of the amplitudes of the harmonic obeys a 1/k regularity, where k represents the order number of the harmonic in question. Different geometries result in different harmonics and envelope curves. The pole pair gaps could now also be optimized for the best possible attenuation of individual disturbance influences. If the disturbance influences are considered in isolation, then it is possible to achieve significantly higher attenuation values or even a complete suppression. Claim 1 pursues this goal with regard to the detent torque. The invention according to claim 6 offers a compromise that results in a reduction of both the detent torque and the K factor of the induced terminal voltage.

For a three-phase machine, there is a general rule that offers the advantage of being able to optimally place the rotor pole pairs as a function of the type of motor, without the need for complex calculations. The distances to be implemented between the pole pairs can be calculated as a function of the number of pole pairs and the wavelength to be attenuated. In addition, the pole pair arrangement reduces harmonics of the induced voltage in the primary part windings. The magnetic coupling between the secondary and primary part is optimized and has an advantageous effect on the operating torque. The magnetic poles can be produced by means of any magnetization method known from the prior art. The effect according to the present invention is thus virtually independent of the magnetization method and can therefore be applied to an extremely wide variety of machines.

If a reference pole pair P1 is established and, in terms of a rotationally symmetrical arrangement, reduces the angular distance to the neighboring pole pair P2 by 3.75° (clockwise rotation), then this has the advantage that the $24^{th}$ harmonic of the detent torque is attenuated by approximately 21%.

If one considers the reference pole pair P1 this time and reduces the angular distance to the neighboring pole pair P2 by 3.75° and reduces the angular distance to the neighboring pole pair P4 by −3.75° (counterclockwise rotation), then this results in an extremely advantageous attenuation of approximately 50%.

A complete suppression of the $24^{th}$ harmonic is achieved if the third pole pair P 3 is also shifted away from its central position (7) by 7.5° (clockwise rotation). This results in the maximum possible advantage of the arrangement, an almost complete suppression of the $24^{th}$ harmonic of the detent torque in actual practice.

A concrete embodiment form of the present invention is also proposed in conjunction with a 3/2 machine having 18 grooves and 6 pole pairs. Any other groove/pole ratio would also be conceivable; this merely requires calculating the pole gaps and pole pair gaps anew. The advantage of this arrangement lies in the embodiment of the windings on the primary part. With a phase winding count of m=3, three parallel branches and thus up to 3 different speeds can be achieved. Other speeds can be achieved depending on the selection of the number of grooves, poles, and phase windings, and on the connection of the coils to one another (parallel, serial, or mixed forms thereof).

Executing further steps yields a largely harmonic-free torque, with a reduction in the K factor of the induced voltage by approximately 68% and a detent torque that is reduced by approximately 33%.

By contrast, if one takes a different embodiment into consideration, then the pole pair shift yields an approximately 67% reduction in the K factor of the induced voltage, but also yields a 61% reduction in the detent torque. An optimization calculation can be used to determine the shift as a function of the machine geometry. Even slight deviations of a few hundredths of the groove pitch can have a drastic effect on the attenuation values achieved. By way of example, the following table shows the relationship between the shifting angle and the attenuation achieved.

TABLE 1

Possible further embodiment forms

| pole pair gaps in degrees | connection of the windings | K factor of the induced voltage | peak-to-peak value of the detent torque |
|---|---|---|---|
| 0° | max. 6 parallel branches | 13.1% | 9.7062 Nm/m |
| 6° 3/10 groove pitch | max. 3 parallel branches, every 2 phase winding coils of adjacent pole pairs in series | 5.5% $5^{th}$ harmonic suppressed. | 6.4882 Nm/m |
| 4.9° ~1/4 groove pitch | max. 3 parallel branches, every 2 phase winding coils of adjacent pole pairs in series | 4.52% $5^{th}$ and $7^{th}$ harmonics equally weighted (without taking envelope curve shape into consideration) | 3.8869 Nm/m |
| 5° 1/4 groove pitch | max. 3 parallel branches, every 2 phase winding coils of adjacent pole pairs in series | 4.36% $5^{th}$ and $7^{th}$ harmonics weighted by order number (taking envelope curve shape into consideration) | 3.7718 Nm/m |

In accordance with another concrete embodiment form of the present invention, 3 phase windings can be used to achieve 2 speeds since there are only two pole pair groups. Respecting the pole pair spacings calculated especially for these embodiment forms likewise yields largely harmonic-free torques and reduced detent torques.

The machine can be produced relatively inexpensively by using permanent magnets to generate the excitation field. These magnets can be purchased in bulk and can be attached to the secondary part in the manner according to the present invention by an assembly apparatus in an automated process. All methods known from the prior art can conceivably be used to produce the excitation poles; this also applies to the excitation windings, for example. Exactly implementing the calculated distances is extremely simple, however, when using permanent magnets.

When a number of individual magnets are used to manufacture a pole, it is possible to compensate for production tolerances in the blanks so that the gaps between poles and between pole pairs can be implemented more exactly. This also reduces the heating of the secondary part due to eddy current losses.

If magnetized rings or tubes, for example, are used for the excitation poles of a synchronous machine, then this achieves a very high precision and the distances to be implemented according to the present invention can be very precisely maintained, as opposed to with glued-on poles. This can be done with all forms of magnetization known from the prior art, for example parallel, diametrical, multipolar, and radial. The characteristic feature of this embodiment form lies in the ability to implement very narrow pole gaps and pole pair gaps, which can be required, for example, with a high degree of pole coverage. The requirement for high precision depends on the practical application because as has already been mentioned, even slight deviations result in a relatively significant influence on the attenuation properties.

Inclined grooves further influence harmonics of the detent torque and of the induced voltage. The same applies to staggered or inclined installation of the permanent magnets on or under the surface of the secondary part along the rotor axis (for example in a rotationally symmetrical system) so that the longitudinal axis of a pole usually aligned parallel to the rotor axis is now inclined by a particular angle in relation to the rotor axis.

A further embodiment requires particular steps to be taken with regard to the existing harmonicity of the induced voltage by contrast with a distributed placement of windings in which it is possible to influence harmonics by means of the coil width and the interconnection of the coils. These steps are not available, however, with the use of a concentrated winding because in the case of a rotationally symmetrical stator, a separate winding is mounted around each individual stator tooth and functions like a resonator at certain frequencies, independent of the geometry. The principle according to the present invention reduces these harmonics in an entirely selective manner and thus has an advantageous effect on the induced voltage in a concentrated winding.

If the three-phase machine according to the present invention is used as a generator, then it supplies a no-load voltage very similar to the ideal sinusoidal form.

Another advantageous embodiment of the present invention is the use as a motor when there is a high demand for precision of the rotary motion. The two inventive steps, namely the reduction of the detent torque and the reduction of the harmonics of the induced voltage, yield a more stable, harmonic-free torque.

A particularly important criterion for machines used in tool engineering and die construction is the required precise execution of work steps. This includes, for example, free form surface machining (milling of contours, turning, grinding, polishing, lasing, drilling) and an exact positioning of the tools. One such example is a ball-shaped milling tool that is used to produce the finished contour line by line. The distance between the runs and the precise guidance of the tool largely determine the surface quality and overall quality of the work piece. It is also desirable for the machines to have a long service life, with a consequent reduction in maintenance costs. A motor according to the present invention fulfills these high demands at a reasonable cost-to-benefit ratio and thus facilitates an inexpensive manufacture of the machining tool.

The apparatuses are required for manufacturing such a machine. In the manufacturing process of the magnetization the blanks attached to the secondary part are magnetized after being mounted in place, taking the geometrical arrangement into consideration. The advantage here is that the mounting process is significantly easier to execute with unmagnetized blanks than with the direct use of permanent magnets. In a mounting process itself, after the geometrical arrangement of the exciters has been established, this process can be executed in large-scale production. The advantage here lies in the fact that when using magnets as exciters, during the gluing or other attachment of the blanks to the secondary part, the determined pole gaps (unmagnetized region between two different poles of a pole pair) and pole pair gaps (unmagnetized region between two pole pairs) are automatically maintained in a very precise manner. After this production step, the excitation poles are thus already in the correct position (e.g. on a rotor) and no subsequent adjustment work is required.

Other advantageous embodiments of the present invention ensue from the remaining dependent claims.

BRIEF DESCRIPTION OF THE DRAWINGS

FIGS. 1 through 6 are all schematic or very schematic depictions and merely serve to illustrate the written explanations.

FIG. 6 shows the implementation of the distributed tooth winding with a phase winding count of m=3 for one phase winding.

DESCRIPTION OF THE PREFERRED EMBODIMENTS

Figure 1:
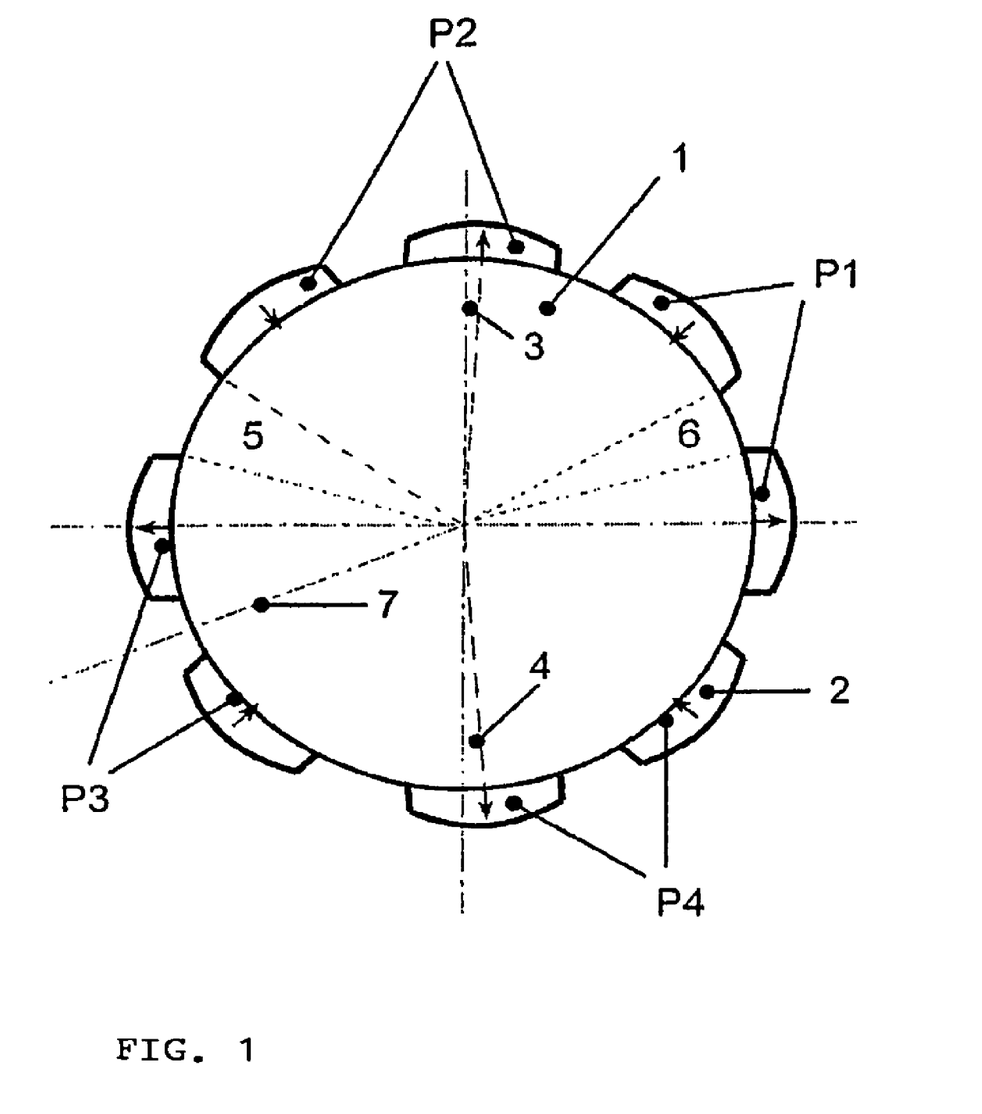
FIG. 1 shows a cross section through a rotor embodied according to the present invention and FIG. 2 shows the vectorial representation (V1-V4) of the components, the $24^{th}$ harmonic of the detent torque in a unit circle. The pole pair associated with the vector (V1-V4) is labeled (P1-P4) (see FIG. 1).

FIG. 1 shows a rotor (1) manufactured according to the present invention. A 3-phase, rotationally symmetrical rotating current motor with a ratio of 3:2 (number of grooves in the stator/number of poles on the rotor) has been selected as an exemplary embodiment. The stator has twelve grooves and the rotor has eight permanent magnets ((2), 4 south poles and 4 north poles) distributed uniformly over the circumference in order to generate the excitation field. Naturally, the excitation field could also be generated by excitation windings, which would then need to be placed on the rotor (1) in the manner according to the present invention. The embodiment of the stator (not shown here), which is essential to the operation, can be taken from the prior art. The winding of the stator is embodied in the form of a pole winding with a phase winding count of m=3, for example. The number of holes for this embodiment calculates out to 12/(2×4×3)=0.5. Permanent magnets (2) that constitute a north or south pole are attached to the rotor (1). Each pole pair (P1-P4) is comprised of two adjacent poles (2) of opposite polarities. With a uniform distribution over the rotor circumference, the distance between the two poles (2) of a pole pair (P1-P4) is a constant 45°. This results in a suppression of the $12^{th}$ harmonic of the detent torque. The spacing of all of the pole pairs (P1-P4) is likewise initially constant due to the uniform distribution of the poles (2). The pole pair P1 should now be selected as a reference pole pair and should no longer be changed in its position on the rotor. The same applies to the opposite pole pair P3. The calculation given in claim 1 for the dominant harmonic of the detent torque based on 6×p (6× the number of pole pairs) thus yields the $24^{th}$ harmonic as the dominant harmonic for the selected arrangement. The pole pair P2 depicted is now shifted in accordance with the formula shown in claim 1 by +¼ the wavelength of the $24^{th}$ harmonic, i.e. the angular distance of the pole pairs P1 and P2 is reduced by 3.75°. This corresponds to a clockwise shifting of P2 on the rotor. The pole pair P4 is shifted by −¼ the wavelength of the $24^{th}$ harmonic, which likewise reduces the angular distance of the pole pairs P1 and P4 by 3.75°, which corresponds to a counterclockwise shift on the rotor.

Figure 2:
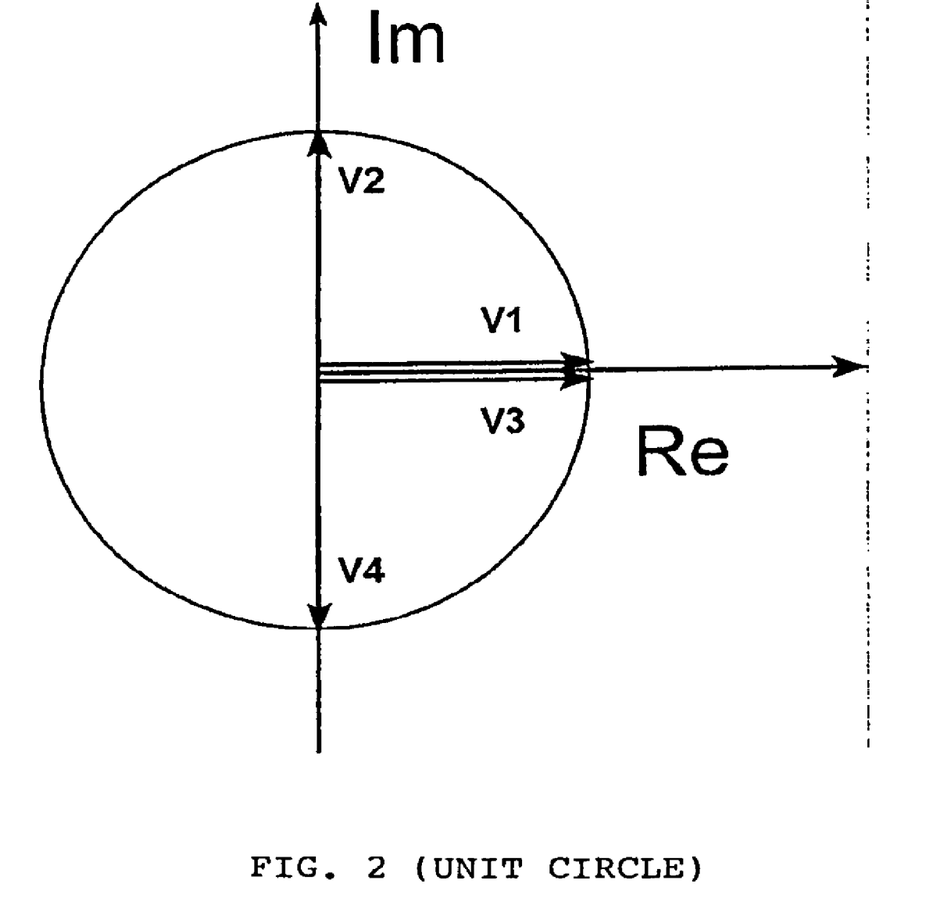

FIG. 2 shows the effect of the pole pair shifting shown in FIG. 1, plotted in the unit circle. The shifting of the phase of the vector V2 by $\alpha_{v,p}=2-1/4=+1/4$ the wavelength equates to an advancing of this vector by 45° in relation to vector V1. The shifting of the vector V4 by $\alpha_{v,p}=3-1/4=+3/4$ or, simply stated, by $-1/4$ the wavelength, equates to a lagging of the vector V4 by 45° in relation to the vector V1. The phase of vector V3 remains unchanged in relation to that of vector V1.

Figure 3:
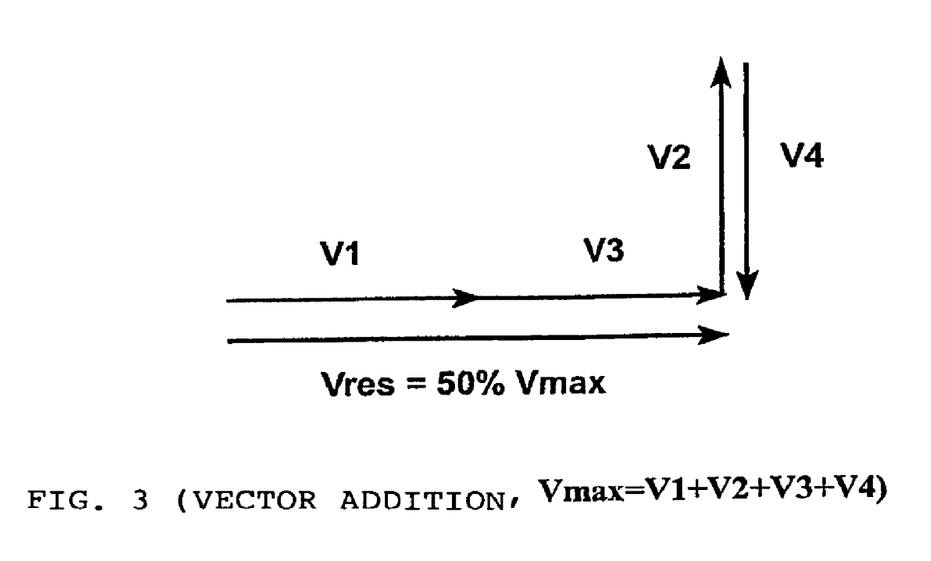
FIG. 3 shows the superposition of all of the vectors.

FIG. 3 shows the superposition of all of the vectors (V1-V4). One mathematically positive rotation corresponds to one counterclockwise rotation in the unit circle and mechanically to one clockwise rotation on the rotor in this concrete example. By contrast, one mathematically negative rotation corresponds to one clockwise rotation in the unit circle and mechanically to one counterclockwise rotation on the rotor. For the sake of clarity, the schematic depictions in FIGS. 1 through 3 show only the details required for comprehension. It is clear that the vectors 2 and 4 cancel each other out since they are situated in phase opposition to each other in the unit circle. By contrast, the vectors 1 and 3 are additive because they are in phase with each other. The sum of the two vectors $V_{res}$ yields the resulting detent torque for the selected arrangement. It is reduced by 50% in comparison to a rotor design without pole pair shifting.

Figure 4:
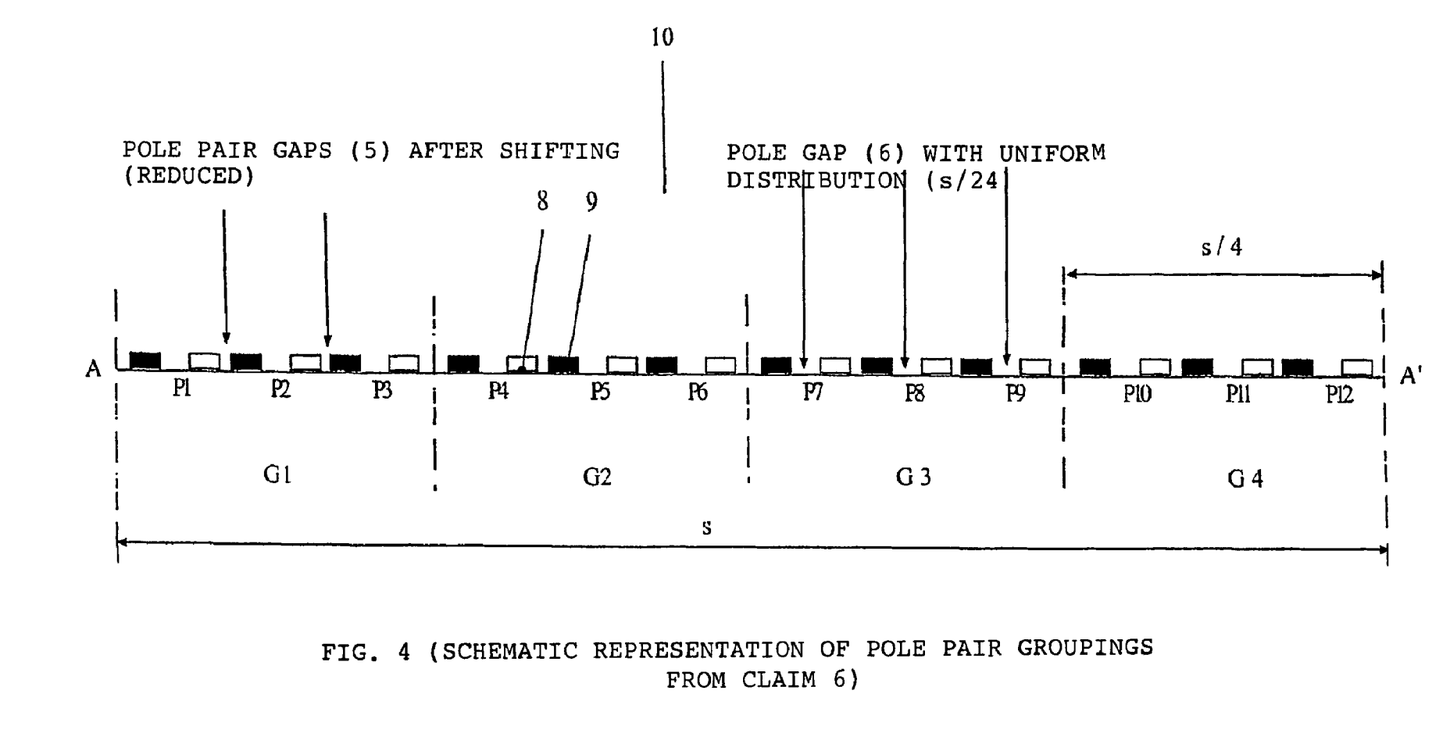
FIG. 4 shows the grouping of the pole pairs according to claim 6.

FIG. 4 shows how the pole pairs (P1-P12) are to be distributed along the segment s in order to implement the embodiment according to the present invention demonstrated in claim 6. Each pole pair (P1-P12) is identified with P+a number. The different colors of the poles (8, 9) identify the different polarity of the poles (8, 9) of a pole pair (P1-P12). This depiction could be taken to show the components (10) of a linear motor or could be taken as the linear depiction of the rotor circumference (10) of a rotationally symmetrical machine, the components of which have been cut parallel to the rotor axis (cutting line A-A'). In both cases, permanent magnets (8, 9) are used to generate the excitation field. In the example shown, there are 24 poles (8, 9). A uniform distribution along the segment s results in an identical pole gap (6, s/24) for all of the poles (8, 9). Twelve of the poles (8, 9) are embodied as north poles and twelve are embodied as south poles. The pole pairs P1 through P12 are composed of the respective pairs of neighboring poles (8, 9) of different polarities. The pole pair gaps (5) are also initially constant at s/24. The groups G1 through G4 are each comprised of 3 pole pairs (P1-P3, P4-P6, P7-P9, P10-P12), with a width of s/4 per group. The pole gaps (6) of the pole pairs (P1-P12) within the groups (G1-G4) are depicted as reduced and are optimized so as to produce the effect according to the present invention. The principle of this arrangement can be applied to any number of pole pairs (P1-P12). It is necessary, however, that each pole pair (P1-P12) belong to a group (G1-G4) and that all groups (G1-G4) contain a uniform number of pole pairs (P1-P12), but at least two pole pairs. The number of pole pairs (P1-P12) must therefore always be divisible by the number of groups (G1-G4), leaving no remainder.

Figure 5:
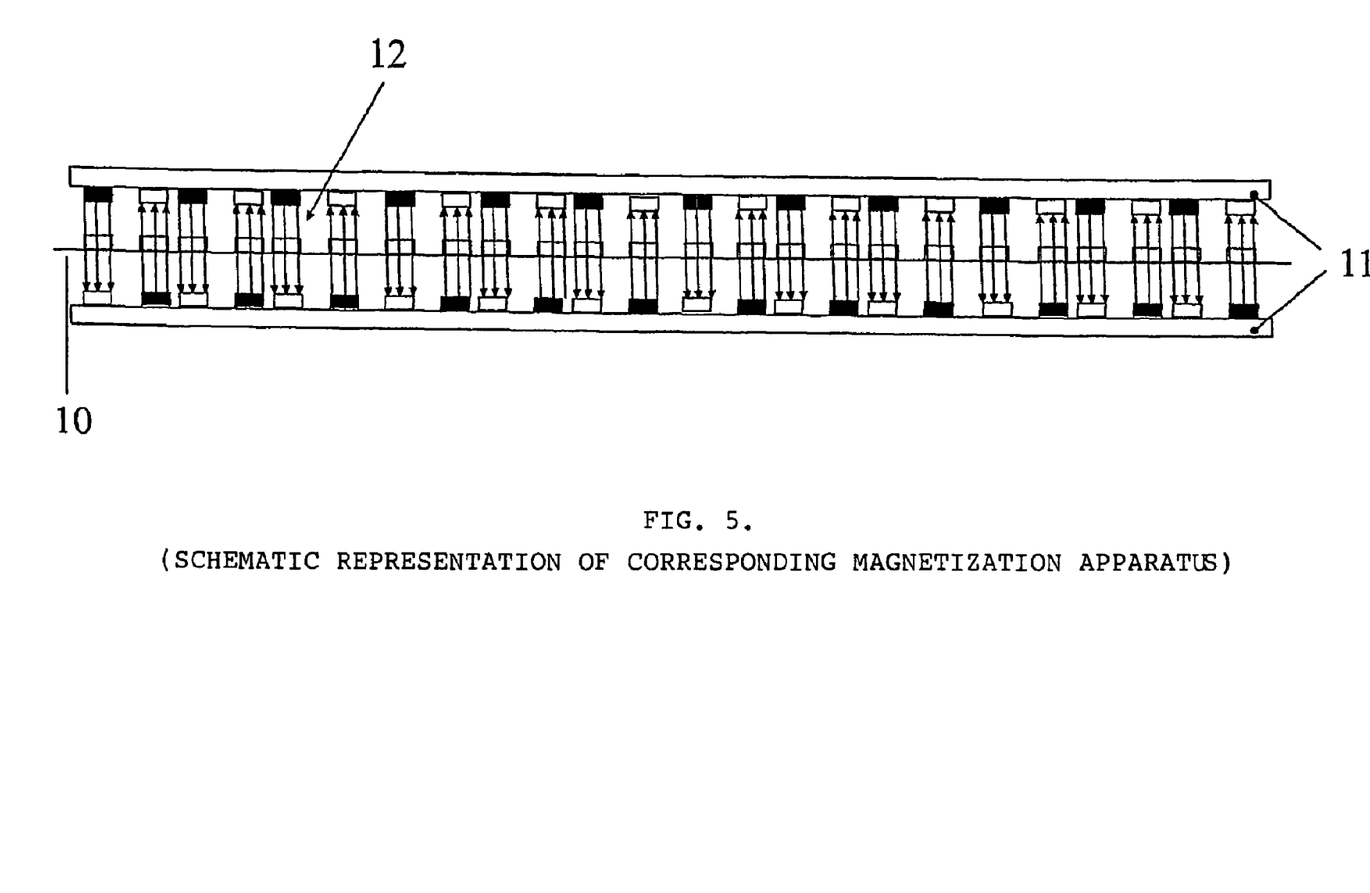
FIG. 5 schematically depicts the geometry of a magnetization device embodied in accordance with the secondary part. In the example of a machine with N=18 grooves.

FIG. 5 depicts in a very schematic way that the field-generating poles of the magnetization apparatus (11) are arranged in accordance with the magnet blanks of the secondary part (10) in order to magnetize them in alternating fashion in the manner according to the present invention. The essential thing in this depiction is that the gaps between the magnetization poles are identical to the pole gaps (6) and pole pair gaps (5) of the secondary part. The arrows in the drawing indicate the magnetic field (12). The embodiment of the field-generating units permits the use of an extremely wide variety of conceivable magnetization principles. A parallel magnetization is shown in the example.

Figure 6:
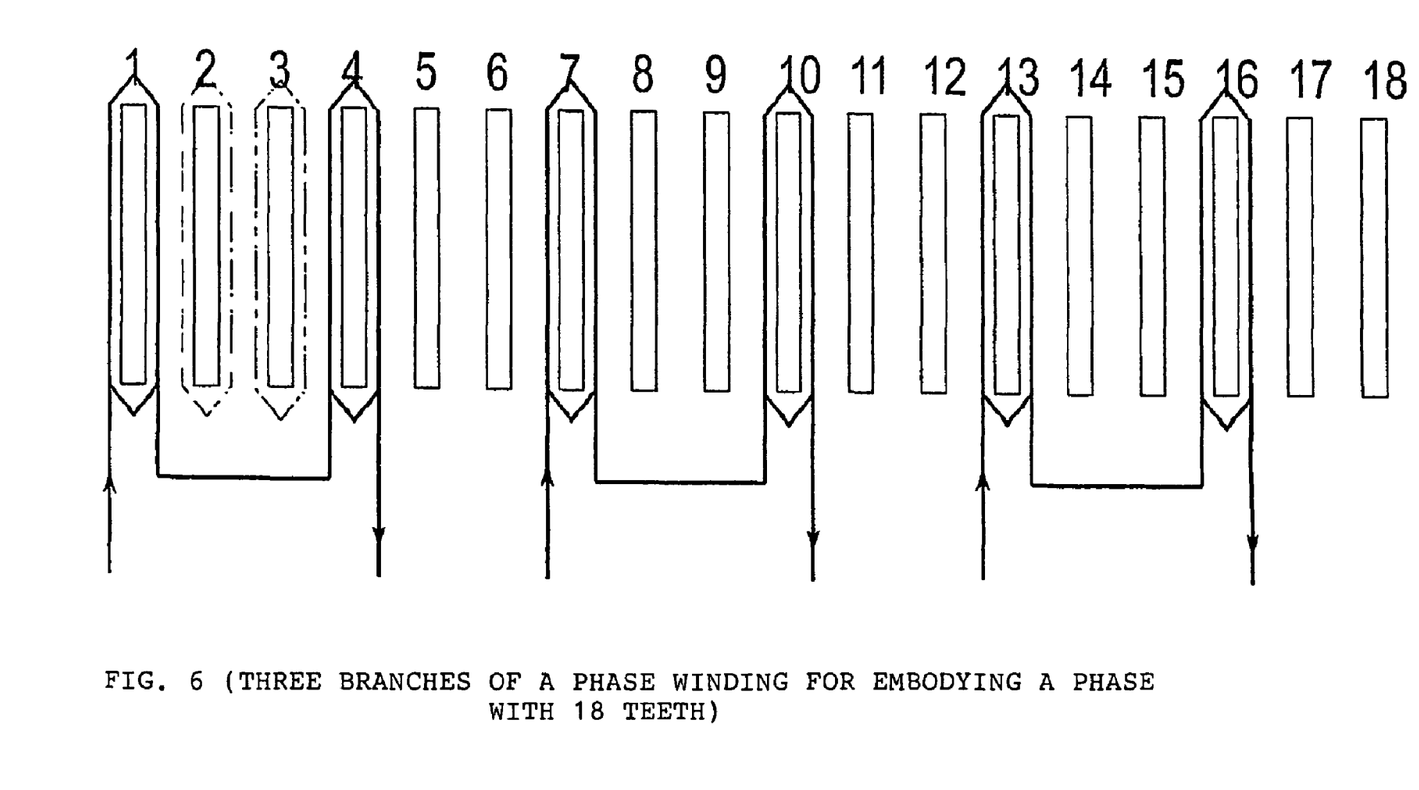

FIG. 6 schematically depicts the embodiment of the superordinate winding comprised of 2 coils (tooth 1+4; 7+10, and 13+16) for one winding phase with a groove count N=18; the connection of the individual superordinate windings here is still open. The unoccupied teeth can be occupied by two other phase windings and wound in the same way as phase winding 1. The teeth are labeled with the reference numerals 1 through 18.

What is claimed is:

1. A three-phase machine having the following features:
a primary part having N grooves and m electrical phase windings;
a secondary part (1) having a number p of pole pairs (P1-P4), each comprised of two magnetic poles (2) of different polarities;
wherein the pole gap (6) is essentially the same for all of the pole pairs (P1-P4) and results from an even distribution of all of the poles (2) on the secondary part (1); wherein at least one pole pair (P1-P4), with no change to its pole gap (6), is shifted by a predetermined distance (5) in relation to an equidistant distribution of all of the pole pairs; and wherein with a groove/pole ratio N/P=3:2, the pole pairs (P1-P4) p are shifted by approximately $\alpha_{v,p}=v-1/p; v=1 \ldots p$ (3,4) the wavelength of the $6 \times p^{th}$ dominant harmonic of the detent torque in relation to the initial position dictated by the uniform distribution, thus reducing or enlarging the pole pair gaps (5).

2. The three-phase machine as recited in claim 1, wherein in a motor having N=12 grooves and p=4 pole pairs (P1-P4), the pole pair P2 next to the reference pole pair P1 is shifted by essentially $+1/4$ the wavelength of the $24^{th}$ harmonic of the detent torque in order to reduce the pole pair gap (5) between P1 and P2.

3. The three-phase machine as recited in claim 2, wherein the pole pair P4 is also shifted by essentially $-1/4$ the wavelength of the $24^{th}$ harmonic of the detent torque in order to reduce the pole pair gap (5) between P1 and P4.

4. The three-phase machine as recited in claim 3, wherein the pole pair P3 opposite from P1 is shifted by $+2/4$ the wavelength of the $24^{th}$ harmonic of the detent torque in relation to its initial position.

5. The three-phase machine as recited in claim 1, wherein the winding is concentrated.

6. The three-phase machine as recited in claim 1, wherein it is a generator.

7. The three-phase machine as recited in claim 1, wherein it is a motor.

8. A use of the machine as recited in claim 7 in a machine for tool engineering and die construction, in printing machines, and generally in drive units for automation technology.

\* \* \* \* \*